United States Patent [19]

Murray

[11] 4,268,783
[45] May 19, 1981

[54] CONTROLLER FOR TOOL COMPENSATION SYSTEM

[75] Inventor: Robert C. Murray, Auburn Heights, Mich.

[73] Assignee: The Valeron Corporation, Troy, Mich.

[21] Appl. No.: 938,432

[22] Filed: Aug. 31, 1978

[51] Int. Cl.³ .............................................. G05B 23/02
[52] U.S. Cl. .................................... 318/565; 318/632; 318/561; 318/585
[58] Field of Search ............... 318/561, 565, 685, 696, 318/632; 307/66

[56] References Cited

U.S. PATENT DOCUMENTS

| | | | |
|---|---|---|---|
| 3,813,592 | 5/1974 | Ryberg | 318/685 |
| 3,962,618 | 6/1976 | Burton et al. | 318/561 |
| 3,967,176 | 6/1976 | Wagener et al. | 318/685 |
| 4,143,283 | 3/1979 | Graf et al. | 307/66 |

Primary Examiner—J. V. Truhe
Assistant Examiner—Eugene S. Indyk
Attorney, Agent, or Firm—Krass and Young

[57] ABSTRACT

A microprocessor-based controller for a stepper motor driven machine tool compensation system is disclosed. The step pulses for the motor are stored in the controller firmware as a table of numbers, each number representing the time elapsing from one motor step command to the next, thus enabling precise generation of the desired motor velocity versus time characteristic. The controller additionally interprets compensation system command inputs, drives a system display unit, and activates appropriate output status signals to the compensation system and machine tool apparatus. The controller is capable of detecting impending commercial power failure and protecting, via battery back-up power, its volatile random access memory.

2 Claims, 10 Drawing Figures

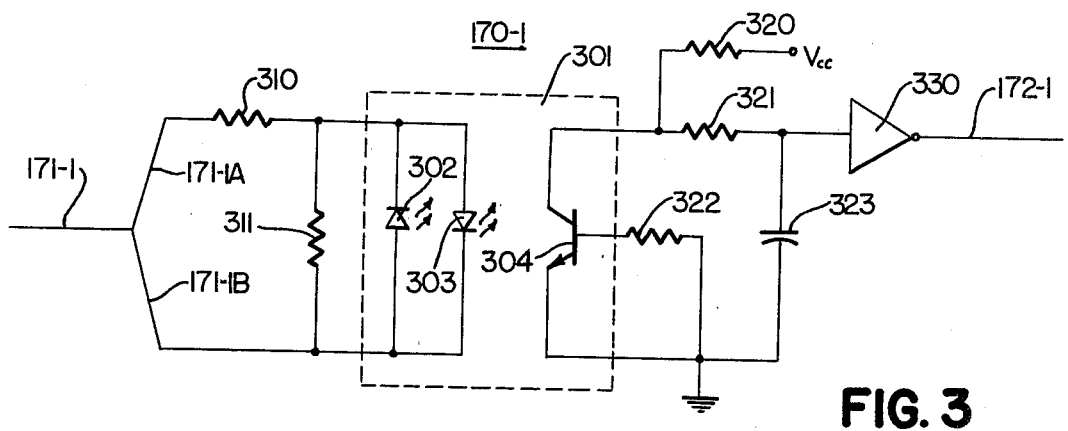
FIG. 3
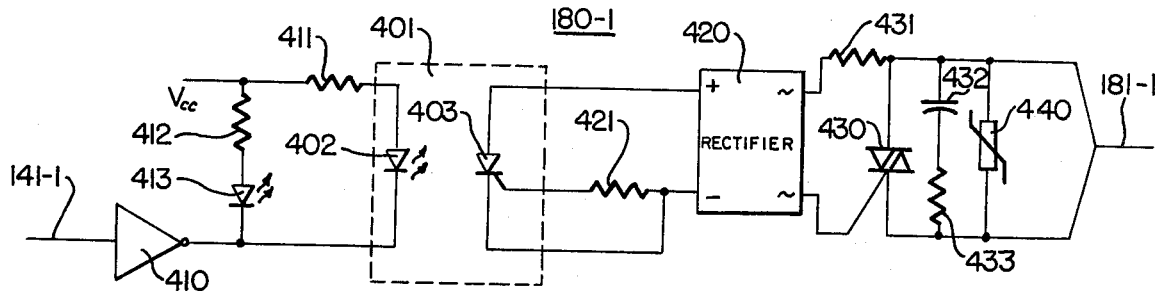
FIG. 4
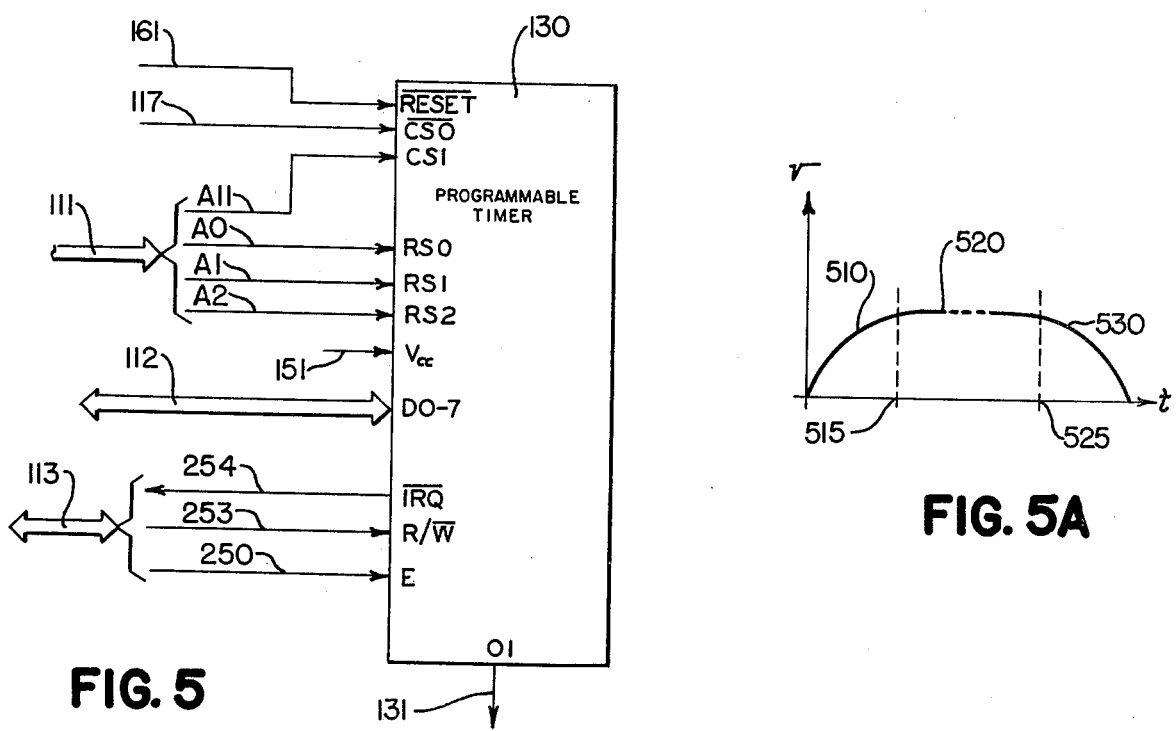
FIG. 5
FIG. 5A

CONTROLLER FOR TOOL COMPENSATION SYSTEM

CROSS REFERENCE TO RELATED APPLICATIONS

This invention is related to U.S. Ser. No. 938,431 entitled STEPPER MOTOR DRIVE APPARATUS by Beer et al, having the same filing date and assignee as the present invention, now U.S. Pat. No. 4,223,260.

BACKGROUND OF THE INVENTION

1. Field of the Invention

The invention pertains to control of synchronous stepper motors. More particularly, the invention concerns a microprocessor-based controller for a stepper motor driven machine tool size adjusting system.

2. Description of the Prior Art

The process of automatic tool compensation in machining is known wherein a cutting edge such as on an indexable carbide insert is adjusted relative to a workpiece to compensate for tool wear. As an added feature, such a compensator can advance the tool prior to beginning a cut and retract the tool a distance from the workpiece surface prior to the retract machine stroke so as to avoid drag-out marks on the surface of the workpiece when the machining process is finished.

One known compensation arrangement utilizes a stepper motor to control compensation either by positioning a stop for an hydraulically driven piston or to directly control insert position via a stepper motor drive translator and ball screw module. Such arrangements are taught in U.S. Pat. No. 3,740,161, issued June 19, 1973, and assigned to the same assignee as the instant invention.

The stepper motor is a specialized form of a synchronous machine designed to rotate its rotor a predetermined amount in response to each electrical pulse received by its drive unit. The rotation is effected by delivering appropriate currents to sequentially selected stator windings of the motor to force the axis of the air gap between rotor and stator poles into alignment.

Prior art stepper motor controllers for furnishing desired motor drive pulse commands have typically been constructed with a large plurality of fixed RC networks in a voltage-controlled oscillator for synthesizing a desired motor velocity versus time waveform. Motor velocity versus time acceleration/deceleration waveforms generated in such a discrete fixed manner have typically been poor approximations of idealized maximum motor performance characteristics and have been difficult to "fine tune".

SUMMARY OF THE INVENTION

Therefore, to overcome such prior art deficiencies, it is an object of this invention to provide a controller for a stepper motor driven tool compensation system that will minimize hardware complexity while enabling precise synthesis of desired stepper motor velocity versus time characteristics.

A microprocessor-based controller for a stepper motor driven machine tool compensation system is disclosed. The time intervals between successive step pulse commands to the stepper motor are stored in a non-volatile, read-only memory as a table of numbers. The microprocessor successively reads the table entries and transmits each number fetched to variable pulse generation means coupled between the microprocessor and the stepper motor, the pulse generation means being operative to transmit a step command pulse of predetermined width to the stepper motor after counting down to zero from the number transmitted from the microprocessor. Because motor step command interpulse time intervals are stored as individual firmware table entries, the motor velocity versus time waveform is controllable to a high degree of accuracy. To protect the microprocessor's volatile random access memory (RAM), the microprocessor inhibits RAM operation in response to a signal indicating impending primary power failure, said signal being generated by an accessory in the controller power supply apparatus.

It is a feature of this invention that the sequence of controller operations can be adjusted during final manufacture or at a later date on site. The meaning and use of various controller inputs and outputs can similarly be altered to meet a particular user's customized application.

BRIEF DESCRIPTION OF THE DRAWINGS

These and other objects and features of the invention will become apparent from a reading of a description of a preferred embodiment taken in conjunction with the drawing in which:

FIG. 3 is a detailed schematic for input command channel 170-1 of FIG. 1;

FIG. 4 is a detailed schematic for output command channel 180-1 of FIG. 1;

FIG. 5 is a detailed functional example implementation of variable pulse generating means 130 of FIG. 1;

FIG. 5A is a typical motor velocity versus time characteristic synthesized by the controller in accordance with the principles of the invention;

DETAILED DESCRIPTION OF THE DRAWINGS

Figure 1:
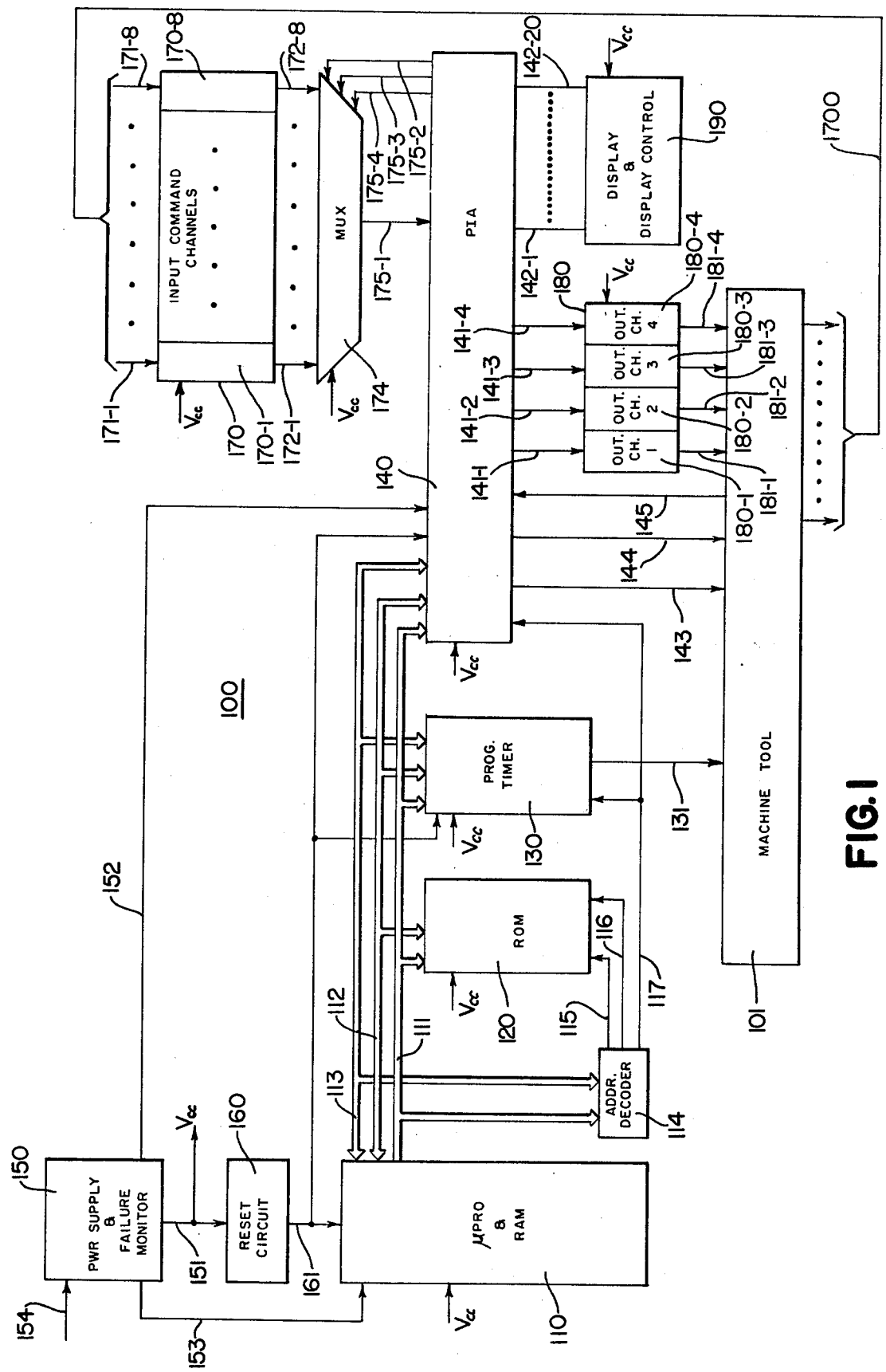
FIG. 1 is a functional block diagram of a microprocessor based controller, arranged in accordance with the principles of the invention.

General Functional Organization—FIG. 1

A microcomputer-based stepper motor controller arranged in accordance with the principles of the invention is set forth in schematic block diagram format in FIG. 1. It will become apparent that subsequent figures of the drawing will set forth further detail of the functional blocks depicted in FIG. 1, with paths interconnecting the various blocks designated with identical reference numerals in all pertinent drawing figures.

Referring to FIG. 1, a microprocessor 110 directs the functions of a controller 100 according to program instructions stored in read-only memory (ROM) 120. For the sake of example, processor 110 could be comprised of the type 6802 commercially available from Motorola, Inc., while ROM 129 could be comprsied of one or more type 2716's commercially available from Intel Corporation. For real time data processing purposes microprocessor 110 also contains its own random access memory (RAM).

Processor 110 is powered over path 151 at a nominal voltage level designated Vcc by power supply and failure monitor circuitry 150, which will be described in more detail in conjunction with FIG. 2A in a subsequent section of the specification. Power supply circuitry 150 receives commercial AC power over path 154 and converts the input to a logic level DC output voltage Vcc for use by the system of FIG. 1 Circuit 150 additionally couples a source of reserve battery power to microprocessor 110 via path 153, and a flag indicating impending commercial power failure via path 152 to peripheral interface adapter (PIA) 140.

A reset circuit 160, coupled between power supply 150 and processor 110 will be later described in further detail in conjunction with FIG. 2B. Reset circuit 160 is coupled to processor 110, programmable timer circuit 130, and PIA 140 via path 161, and is coupled to power supply 150 via path 151.

Unidirectional address bus 111 couples processor 110 to address decoder 114, ROM 120, programmable timer 130, and PIA 140. Bi-directional data bus 112 interconnects processor 110 with ROM 120, timer 130, and PIA 140, while a bi-directional miscellaneous control bus 113, carrying various timing and enabling signals, interconnects processor 110 with address decoder 114, timer 130, and PIA 140. Timer 130 will be described below in more detail in conjunction with FIG. 5, and PIA 140 will be later described in conjunction with FIG. 6.

Block 101 of FIG. 1 represents a machine tool system to be compensated by the controller of FIG. 1 via a stepper motor (not shown) that is an integral part of system 101. A plurality of AC input channels (eight for this specific example) is coupled from compensatable system 101 to the controller 100 via cable 1700 to a corresponding plurality of input channels 170-1 through 170-8. A typical input channel, 170-1, will be described later in conjunction with FIG. 3.

The outputs of 170-1 through 170-8 are respectively coupled via paths 172-1 through 172-8 to multiplexer 174, which has a single output 175-1 coupled to PIA 140. Multiplexer 174 additionally has decoding inputs 175-2 through 175-4 coupled to PIA 140.

Processor 110 is capable of issuing motor step commands via programmable timer 130 over path 131 to system 101. Additionally, processor 110 can issue motor direction and drive current level indicators to system 101 via PIA 140 and paths 143 and 144. System 101 transmits a tool proximity indication from a proximity sensor to controller 100 via path 145 coupled to PIA 140.

Various collateral commands for compensator status indications may be issued by controller 100 to system 101 via paths 141-1 through 141-4 respectively coupling PIA 140 to AC output command channels 180-1 through 180-4. Command channels 180-1 through 180-4 are, in turn, respectively coupled to system 101 via paths 181-1 through 181-4. A typical AC output channel, 180-1, will be described later in more detail in conjunction with FIG. 4.

PIA 140 is further coupled via paths 142-1 through 142-20 to a thumb wheel switch (TWS) and light emitting diode (LED) display and display control circuit 190, which will be later described in more detail in conjunction with FIG. 7.

From the system structure set forth above in conjunction with FIG. 1, it is seen that processor 110 gains access to ROM 120, timer 130, and PIA 140 by placing an appropriate address on bus 111, a portion of which is decoded by address decoder 114 and converted to an enable signal on one of paths 115, 116, or 117, respectively coupling decoder 114 to ROM 120 timer 130 and PIA 140.

For the sake of example, the system of block 101 is assumed to comprise a machine tool system having a stepper motor driven compensation arrangement wherein the motor co-acts with a motor drive translator and ball screw module to adjust the position of a cutting tool insert. Such a system is disclosed in detail in the above-identified U.S. Pat. No. 3,740,161, which is hereby incorporated by reference and will not be further disclosed in this specification. With such a system, various command inputs may be utilized to request appropriate actions by the controller 100 of FIG. 1. It will be appreciated that, with the inherent flexibility of a processor-based system such as controller 100, the meaning of the inputs 171-1 through 171-8 or the meaning of status indications 181-1 through 181-4 can be altered to meet a particular user's needs. Solely for the sake of example, the following tables of possible input and output definitions are set forth as usable with a compensatable system 101 such as that described in U.S. Pat. No. 3,740,161.

AC Command Channel Inputs 171-1: RETTL—Command to retract the cutting tool of system 101 to a retracted, or home position.

171-2: ADVTL—Command to advance the cutting tool of system 101 to an active, or cutting, position.

171-3: INCRS—Command to compensate the cutting tool of system 101 such that the workpiece machined size is increased.

171-4: DECRS—Command to compensate the cutting tool of system 101 such that the workpiece machined size is decreased.

171-5: RESTL—Command to reset the tool position of system 101 and to clear the controller's display and software counters. This command is functionally effective only when system 101 is in a manual mode of operation.

171-6: NOTXF—An "off" condition for this AC input is a command to reset the control sequence thus inhibiting multiple system 101 tool compensation for any given workpiece being machined. The system 101 will only compensate the cutting tool when a workpiece is not being moved (transferred) from one work station to the next.

171-7: CLRCMP—"Clear to compensate" command permits an INCRS or DECRS command to be processed by controller 100.

171-8: AUTO—Command to operate the compensation system of 101 in the automatic mode via controller 100. An "off" condition of this signal is a command to operate system 101 in the manual mode.

The INCRS and DECRS commands are typically energized at system 101 by a gaging sub-system, chosen from a number of such sub-systems known in the art, coupled to a workpiece that has previously been machined.

AC Output Signals

181-1: TLRET—Energized when a tool of system 101 is in the retracted, or home, position.

181-2: TLADV—Energized when the tool of system 101 is in a cutting position, compensated if necessary.

181-3: HILIM—Energized when controller 100 determines that a maximum number of compensations in one direction have occurred for the same cutting tool. The maximum number is determined by the setting of a thumb wheel switch at display 190 of FIG. 1.

181-4: FAILRT—Energized whenever controller 100 does not receive a proximity detection signal from system 101 after stepping the stepper motor in the tool retract direction a programmed maximum number of steps.

Again with reference to FIG. 1, the eight AC input signals carried via paths 171-1 through 171-8 are converted by input circuits 170-1 through 170-8 to DC logic level signals at paths 172-1 through 172-8. To minimize required PIA input pins, the signals at paths 172-1 through 172-8 are condensed to a single PIA input at path 175-1 via multiplexer 174, which may be typically comprised of a type 14052, commercially available from Motorola, Inc. Hence, it is seen that whenever processor 110 desires to read in the state of a particular input channel, processor 110 transmits via data bus 112, a three-bit binary number, corresponding to the desired input channel number, to PIA 140 for presentation via paths 175-2 through 175-4 to multiplexer 174. Then, also via data bus 112, processor 110 reads the logic level at the PIA 140 input coupled to path 175-1.

In a similar manner utilizing PIA 140, processor 110 can transmit appropriate logic level signals to AC output channel circuits 180-1 through 180-4 for conversion to appropriate AC signals for presentation of status indications to system 101 via paths 181-1 through 181-4.

Step pulses for the stepper motor (not shown) of compensatable system 101 are coupled to a drive circuit for the stepper motor via path 131 from programmable timer 130. One such stepper motor drive circuit appropriate for use with controller 100 of FIG. 1 is disclosed in the co-pending application identified in the above Cross Reference to Related Applications. Other commercially available stepper motor translator and driver arrangements such as the STM-101 and STM-103 translator modules of the Superior Electric Company will also function with the controller of this invention.

Motor pulse step timing is determined by programmable timer 130 in conjunction with at least one table of numbers stored in "firmware", or ROM 120. The table entry numbers each represent the time interval between one motor step command and the next. Hence, to generate a desired motor velocity versus time curve, processor 110 selects a corresponding table of numbers in ROM 120 via address bus 111 and address decoder 114 and fetches, via data bus 112, one table entry at a time. Each number is then consecutively transmitted via data bus 112 to programmable timer 130. Timer 130 counts down to zero from the number so received and then transmits a step command pulse of predetermined width via path 131 to system 101.

Because the interstep time intervals are stored in ROM 120 as individual table entries, the motor velocity versus time characteristic (such as shown in more detail in FIG. 5A) is controllable to a fine degree.

Figure 2A:
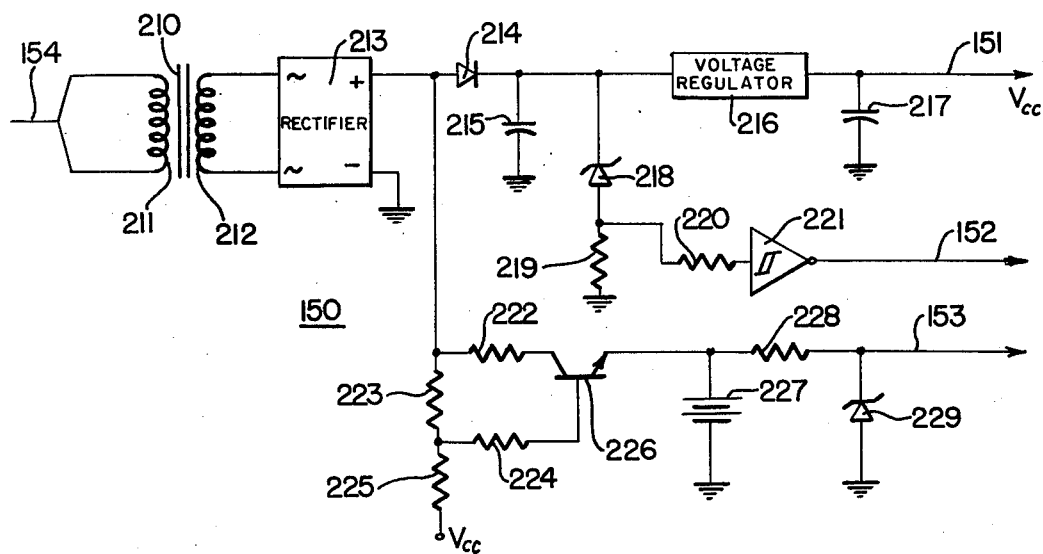
FIG. 2A is a functional schematic of power supply and failure monitor circuitry shown as block 150 in FIG. 1.

Power Supply and Failure Monitor—FIG. 2A

Power supply and failure monitor circuit 150 of FIG. 1 is set forth in more detail in FIG. 2A. Commercial, or primary, AC power at cable 154 is applied to a rectifier 213 via transformer 210. Rectifier 213 could, for example, be selected as a type VE18X, commercially available from Vero Semiconductors, Inc. The positive DC potential at the positive output terminal of rectifier 213 provides a potential of a magnitude sufficient to both provide the nominal system logic voltage level Vcc at path 151 via IC regulator 216 and diode 214, and to provide a trickle charge to reserve power supply battery 227 via a charging circuit comprised of transistor 226 and resistors 222 through 225. Capacitors 215 and 217 provide filtering action to the primary logic potential at output 151 of the power supply. Resistor 228 and zener diode 229 regulate the back-up potential level at output path 153. Regulator 216 could, for example, comprise a commercially available IC type LM309K.

The impending primary power failure indication circuit is comprised of zener diode 218, resistors 219 and 220, and inverter amplifier 221. When commercial power at path 154 begins to decrease, then, depending upon the characteristics of zener diode 218, at a predetermined rectified voltage level at the output of rectifier 213, a logic state change occurs at the input of inverter 221 which generates an impending power failure indication at its output (path 152). The warning indication at 152 is coupled to PIA 140 (as shown in FIG. 1) and will generate a processor interrupt from PIA 140 when processor 110 reads the appropriate latched output storing the occurrence of this indication. Upon this interrupt, processor 110 will, via back-up power source 227, maintain intact critical portions of its internal memory and inhibit any attempt to alter such memory portion until power is restored.

Figure 2B:
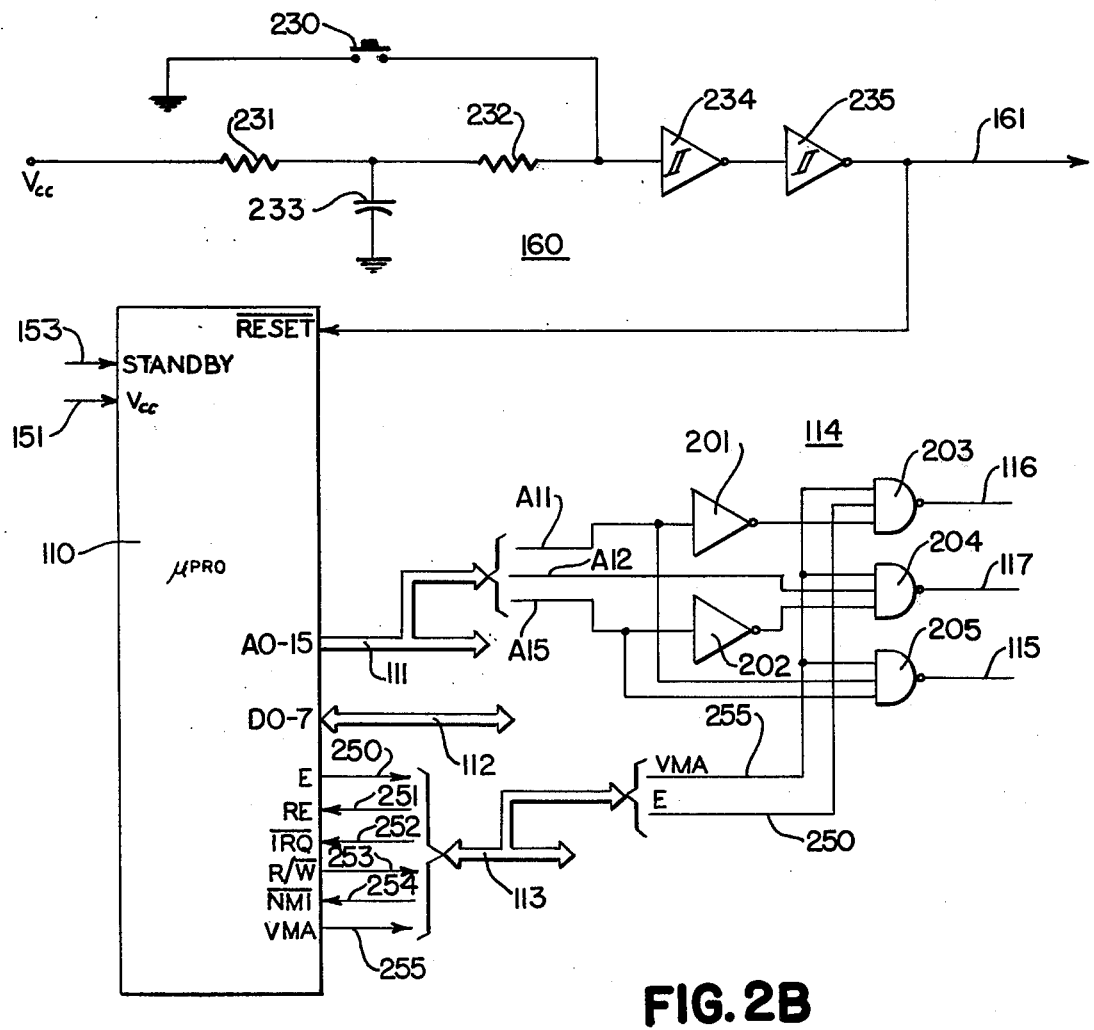
FIG. 2B is a detailed functional diagram of microprocessor 110, peripheral address decoder 114, and reset circuit 160, all of FIG. 1.

Reset Circuit, Microprocessor, and Address Decoder—FIG. 2B

As mentioned previously, processor 110 could be comprised of the Motorola type 6802. The pertinent pin connections for use of such a circuit in the invention is set forth in FIG. 2B. Destinations of all leads may be readily determined with reference to FIG. 1, as all reference designations for the paths of FIG. 2B are identical to the corresponding paths shown in the system block diagram of FIG. 1.

The mneumonic pin designations at the processor chip are well-known in the art, and a detailed description of the functions thereby provided are set forth in Motorola data sheets for the 6802 device.

FIG. 2B also sets forth the logic gate implementation of address decoder 114 of FIG. 1. Address bus path A11 is shown coupled to an input of inverter 201 and to a first input of NAND gate 205. Address bus path A12 is coupled to a first input of NAND gate 204 while address bus path A15 is coupled to an input of inverter 202 and to a second input of NAND gate 205. The output of inverter 201 is coupled to a first input of NAND gate 203, while the output of inverter 202 is coupled to a second input of NAND gate 204.

Path 250 (from the E, or clock source, output of processor 110) of miscellaneous control bus 113 is coupled to a second input of NAND gate 203. Path 255 (from the VMA, or "Valid Memory Address", output of processor 110) of miscellaneous control bus 113 is coupled to a third input of NAND gate 203, a third input of NAND gate 204, and a third input of NAND gate 205.

With the logic structure above described, a predetermined portion of an address at bus 111 will generate peripheral device enabling signals at one of the address decoder outputs 115, 116, or 117, to respectively select ROM 120, timer 130, or PIA 140 of FIG. 1.

FIG. 2B additionally sets forth a more detailed functional representation of reset circuit 160 of FIG. 1. A reset signal (logic zero) as provided at path 161 via gates 234 and 235 either by depressing push button 230 or by loss of logic level potential Vcc coupled to an input of gate 234 via an RC network comprised of resistors 231 and 232 and capacitor 233. Path 161 is coupled to the reset input of processor 110 and (as seen from FIG. 1) to inputs of programmable timer 130 and PIA 140. A logic low, or zero, on path 161 will inhibit further operation of controller 100 of FIG. 1. When the logic zero is removed from path 161, processor 110 will be initialized and re-started at a predetermined point of its stored program instruction sequence, and all control registers of the various peripheral units will be set to a predetermined initial state.

Typical AC Input Command Circuit—FIG. 3

AC input command circuit 170-1 of FIG. 1 is shown in more detail in FIG. 3. The components and their interconnections are identical to those used in circuits 170-2 through 170-8 of FIG. 1.

As seen from FIG. 3, cable 171-1 comprises a pair of leads 171-1A and 171-1B for coupling AC signals via resistors 310 and 311 to optical coupling circuit 301. Optical coupler 301 could, for example, be comprised of the commercially available type H11AA1. Coupler 301 is comprised of oppositely-poled photo-emitting diodes 302 and 303 and of photo-transistor 304. Hence, regardless of the AC polarity of the signal at 171-1, photo-coupling from either diode 302 or 303 will occur.

Resistor 322 is coupled between the base of transistor 304 and the grounded emitter of transistor 304. Bias potential Vcc is coupled to the collector of transistor 304 via resistor 320, and the collector of transistor 304 is further coupled via resistor 321 to an input of inverter 330. Capacitor 323 is coupled between the input to 330 and ground.

With the above described structure, each AC input circuit, such as 170-1, converts (typically 120 volt) AC command signals to logic level DC potentials, while the optical coupling devices serve to isolate the microcomputer-based controller 100 of FIG. 1 from high voltage transients that may be associated with AC command signals appearing at paths 171-1 through 171-8 of FIG. 1.

Typical AC Output Circuit—FIG. 4

AC output circuit 180-1 of FIG. 1 is shown in more detail in FIG. 4. Similar to the input circuits 170, optical coupling is again utilized for protective electrical isolation of the electronic controller 100 of FIG. 1 from the "outside world". Circuits 180-2 through 180-4 of FIG. 1 are identical in structure to the detail shown for circuit 180-1 in FIG. 4.

Output circuit 180-1 converts DC logic potential signals at 141-1 into simulated relay contact closures across output cable 181-1. Rather than using actual mechanical relay contacts, the AC loop closure at 181-1 is effected by triac 430. Triac 430 could comprise, for example, the type SC146D, commercially available from General Electric Company.

The DC signal at 141-1 is coupled via inverter 410 to optical coupler 401, which, for example, could comprise type H11C1. The output of optical coupler 401, is, in turn, connected to the DC terminals of rectifier bridge 420 (typically comprised of a type VE18X), whose AC terminals are coupled, via resistor 431, across triac 430. Excessive AC potential transients at cable 181-1 are suppressed using varistor 440 coupled across the AC line 181-1 in parallel with the series combination of resistor 433 and capacitor 432.

For output circuit 180-1 only, an additional element, LED 413, is coupled from potential source Vcc via resistor 412 to the output of inverter 410. Hence, whenever AC output channel 181-1 is activated, LED 413 will simultaneously be illuminated to provide a local indication at controller 100 that the machine tool in compensatable system 191 (FIG. 1) has failed to retract, as instructed (see the previous description of the typical output definition suggestion for 181-1, FAILRT).

Programmable Timer—FIG. 5

Programmable timer 130 of FIG. 1 is depicted in more detail in FIG. 5. For this exemplary embodiment, timer 130 comprises a 6840 Programmable Timer Module (PTM), commercially available from Motorola, Inc. This device provides a means of variable pulse generation whose output couples step commands to the stepper motor of system 101 of FIG. 1. Pulse generation is variable, in that the time interval between successive output pulses is programmable in a manner to be described below.

Referring to FIG. 5, the mneumonics for the pertinent pin designations of the 6840 are shown along with their interconnection to the bus and dedicated lead structure of FIG. 1. The detailed definitions of each lead will not be set forth herein, as such information is readily available from data sheets covering the Motorola 6840 PTM.

The basic operation of the PTM, as connected in the instant embodiment, may be summarized as follows: The PTM receives a number via data bus 112, counts down from the received number until it reaches zero, generates a pulse of predetermined width at its output 131, and generates an interrupt request, $\overline{IRQ}$ on path 254 of miscellaneous bus 113, to processor 110 of FIG. 1.

Motor Acceleration Characteristic Generation—FIG. 5A

The general shape of a typical stepper motor velocity versus time characteristic, synthesizable by controller 100 of FIG. 1 is depicted in FIG. 5A. The accelerating 510 and decelerating 530 portions of the characteristic are generated using the previously discussed firmware tables of ROM 120 in conjunction with PTM 130. The slewing interval 520 of the characteristic may be maintained using a predetermined numerical constant for transmittal to PTM 130 (i.e. the motor velocity during slewing is constant, therefore processor 110 would merely load the same number into PTM 130 during this time for uniformly spaced step commands to the motor compensatable system 101 of FIG. 1.) It will be apparent to those skilled in the art, that such a numerical constant could comprise the final entry in a table in ROM 120.

It will also be appreciated that, where deceleration portion 530 of the characteristic of FIG. 5A is the mirror image of the acceleration portion 510, the same ROM 120 table of numbers may be used to generate both curves merely by reading the table entries in one direction for acceleration and in the opposite direction for deceleration.

The number of ROM table entries is chosen as a function of desired motor acceleration and deceleration response. The faster one wishes the motor to reach the slewing interval, the fewer the number of table entries required.

Figure 6:
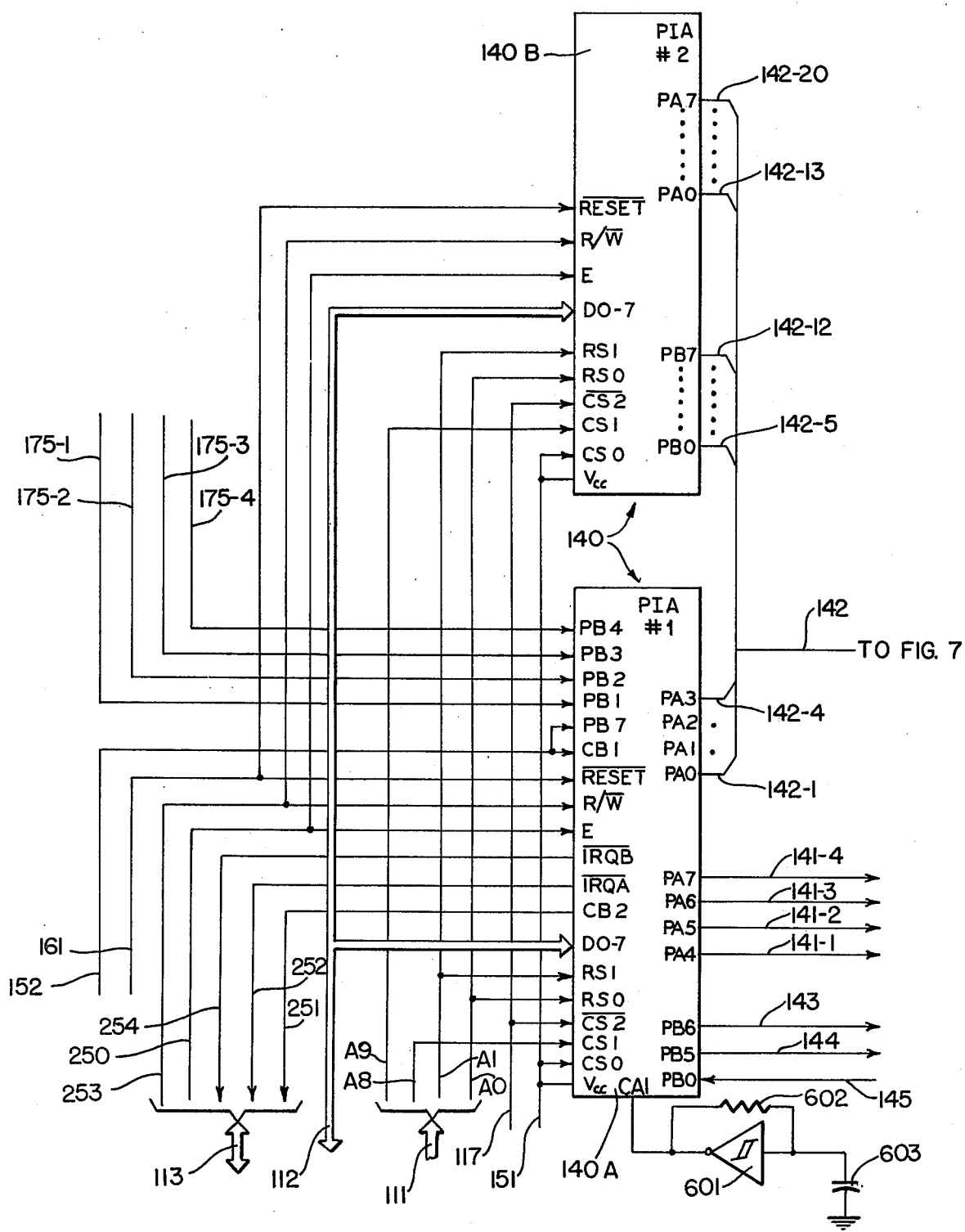
FIG. 6 is a detailed functional example implementation of the peripheral interface 140 of FIG. 1.

Peripheral Interface Adaptor—FIG. 6

Peripheral interface adaptor 140 of FIG. 1 is shown in more detail in FIG. 6. PIA 140 is comprised in this embodiment of two Motorola 6820 IC chips 140A and 140B. As is well known in the art, these devices provide universal means of interfacing peripheral equipment to a microprocessor such as the Motorola 6802.

FIG. 6 shows the interconnection of pertinent PIA pins to the bus and dedicated lead structure of the controller of FIG. 1. The difinitions of the various pin mneumonics are readily available from data sheets for the 6820 device and will not be repeated in this specification.

Figure 7:
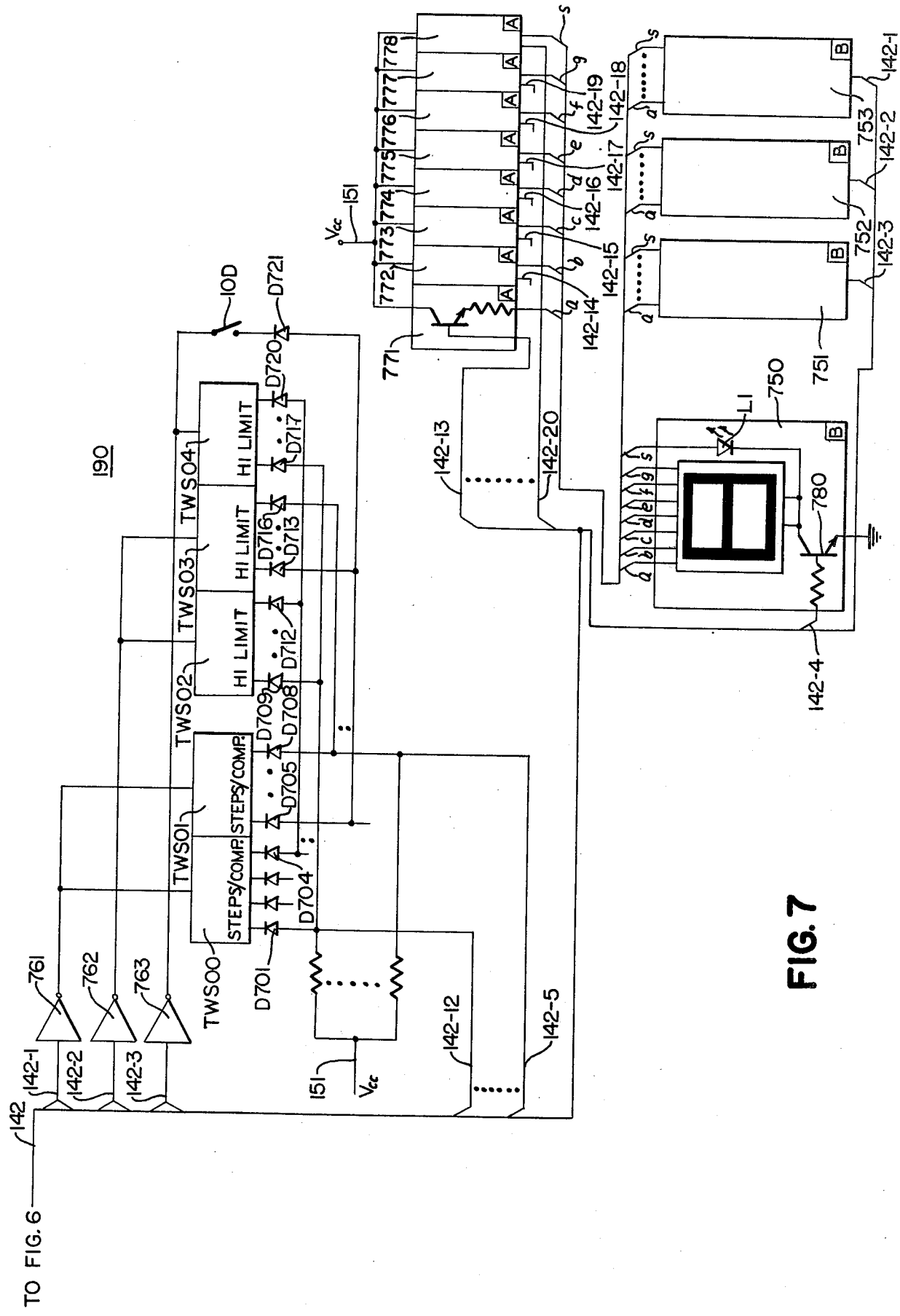
FIG. 7 is a more detailed functional diagram of display unit 190 of FIG. 1.

An oscillator comprised of inverter 601, resistor 602 and capacitor 603 generates a 250 Hz timing signal at pin CA1 of PIA 140A used for defining the scanning rate of display control circuit 190 of FIG. 1, to be discussed in more detail in conjunction with FIG. 7. Twenty leads, 142-1 through 142-20, are shown as a single cable 142 going to the display and display control circuitry 190 of FIG. 7.

It is to be noted that all lead designations of FIG. 6 are identical to corresponding paths shown in the controller system block diagram of FIG. 1.

Display and Display Control Circuitry—FIG. 7

Display and display control apparatus 190 of FIG. 1 is depicted in greater detail in FIG. 7. For this illustrative embodiment, thumb wheel switches (TWS) 00–04 are coupled to PIA 140 (FIG. 6) to enable manual input to the controller of the number of motor steps per compensation command (TWS 00 and 01) and the "high limit", for maximum number of compensations in one direction permitted for the same cutting tool of a system 101 of FIG. 1 (TWS 02, 03, and 04).

In addition to the thumb wheel switches, single pole single throw switch IOD is coupled to PIA 140. The position of switch IOD informs controller 100 whether an inside or outside workpiece diameter is being measured by the gaging subsystem of compensatable system 101. If an inside diameter is being measured the increase and decrease compensation AC input commands described herein above act to respectively increase and decrease workpiece size. If an outside diameter is being measured, the directional sense of the increase and decrease commands is reversed.

The 250 Hz oscillator mentioned above with reference to FIG. 6 causes PIA 140 to sequentially scan TWS 00 through 04 and switch IOD via paths 142-1, 142-2, and 142-3, and their associated inverters 761, 762, and 763, and to receive back binary information corresponding to the various switch positions via paths 142-5 through 142-12. Diodes D701 through D721 are included in the scan paths in a well-known configuration to prevent interference among switch units coupled to common scan points 142-5 through 142-12.

Circuitry 190 additionally includes a signed, three-digit numerical display comprised of four identical modules 750 through 753. The signed three-digit number is constantly updated by the controller of FIG. 1 to reflect the cumulative number and direction of the machine tool compensations performed on system 101 of Fig. 1. Only the details of module 750 are set forth in FIG. 7. Each module contains a seven segment visual display and a separate light emitting diode L1. Each of the seven segments of each module is coupled to its respective a-f input while the anode of each LED is coupled to the s input. The a-f and s inputs are dervied from emitter electrodes of respective transistor drivers 771 through 778. Transistors 771-778 are enabled by base drive signals appearing at paths 142-13 through 142-20 coupled to PIA 140 of FIG. 6.

Each of the modules 750 through 753 is enabled by base drive to a corresponding transistor 780 of each module, transmitted thereto via paths 142-1 through 142-4 of PIA 140 of FIG. 6. Transistors 771-778 and transistor 780 are used to amplify the digit enable and segment signals from PIA 140 to a level required to ignite the display elements.

Each LED, L1, of modules 750 through 753 is utilized to visually indicate the functional status of controller 100 of FIG. 1. For the instant embodiment, L1 of module 750 indicates the maximum number of tool compensations has been exceeded, L1 of module 751 indicates that the machine tool of system 101 is retracted, L1 of module 752 indicates that the machine tool of system 101 is in the cutting, or advanced, position, and L1 of module 753 indicates that the stepper motor of system 101 is running, or "in process".

The individual digits of the seven-segment displays are enabled one at a time, 250 times per second, by PIA 140 in conjunction with data received from processor 110 of FIG. 1. No two digits are actually illuminated at any one instant of time, but, because of the rapidity of the sequential scanning via PIA 140, all four display characters appear to be constantly illuminated.

Figure 8:
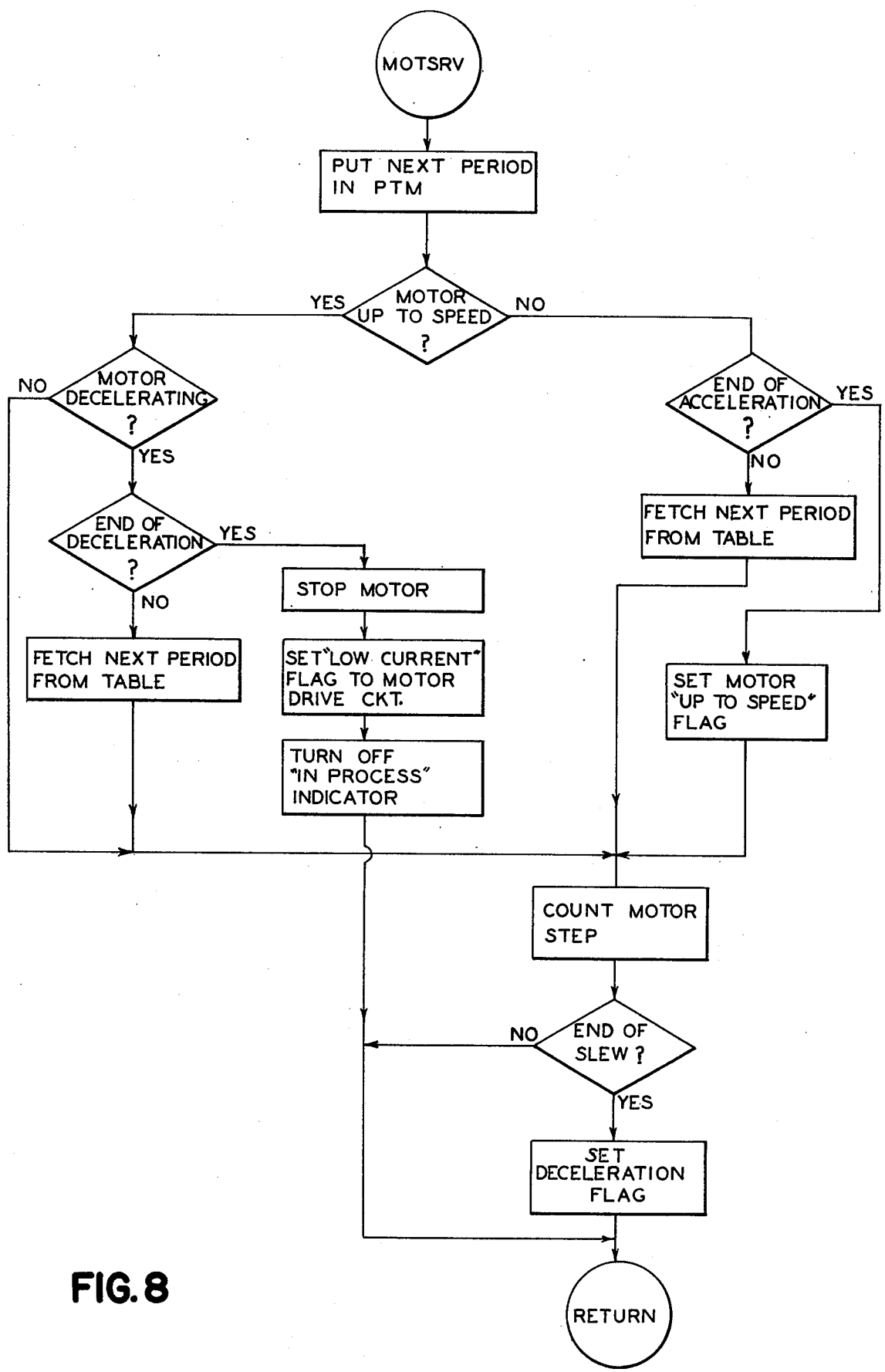
FIG. 8 is a sequential flow diagram of a portion of the controller's stored program used for providing a sequence of motor step commands in accordance with the principles of the invention.

Sample Operation Sequence—FIGS. 1 & 8

A typical operation example is best set forth with reference to the system diagram of FIG. 1, keeping in mind that the individual elements of FIG. 1 are set forth in FIGS. 2–7.

Assume a part just machined and gauged by system 101 of FIG. 1 results in an indication that the part is undersized from the desired nominal value. System 101 then generates an INCRS signal at AC command input at 171-3, which is converted to logic level potential by circuit 170-3 and read by processor 110 via PIA 140 and data bus 112.

Next, assume that processor 110 examines its "high limit" counter and determines that at least one additional tool compensation of system 101 is permissible. Processor 110 then prepares to advance the tool system 101 via stepper motor commands from PTM 130. The tool advance under the conditions of an INCRS AC input command will include compensation of additional motor steps determined by the pre-set steps per compensation parameter read by processor 110 from appropriate thumb wheel switches at display 190 via PIA 140.

At this point the desired stepper motor velocity versus time characteristic, including the length of the desired slewing interval, is known and the appropriate ROM 120 table of interstep time durations is selected by processor 110 for use in conjunction with PTM 130.

When PTM 130 is set up and loaded with the initial ROM 120 table entry, PTM 130 counts down to zero, steps the motor of system 101, and then interrupts processor 110. These interrupts are handled by a processor subroutine such as that depicted by the flow chart set forth in FIG. 8.

Referring to FIG. 8, subroutine "MOTSRV" places a previously fetched number into PTM 130 in preparation for timing the next interstep motor command pulse interval. Next, by examining the current address pointer to the table being used in ROM 120, processor 110 determines if the motor is up to speed.

Assuming the motor is not yet up to speed, the processor tests for termination of the motor acceleration interval. If the motor were found "up to speed" (i.e. ready to begin the slewing interval 520 of FIG. 5A), an appropriate flag is set. If not up to speed, the next ROM 120 table entry is fetched by processor 110 via data bus 112 and saved for the next call of subroutine MOTSRV.

Next, a counter recording the cumulative motor steps taken to this point is updated and compared to the predetermined desired slewing time interval. If the slewing interval is ending, a flag requesting initiation of motor deceleration is set for use on the next call of subroutine MOTSRV.

The deceleration flag will subsequently cause the ROM 120 table to be read in inverse order on ensuing calls of subroutine MOTSRV, as shown by the program flow in the lefthand portion of FIG. 8.

It should be noted that the invention described herein has been illustrated with reference to a particular embodiment. It is to be understood that many details used to facilitate the descriptions of such a particular embodiment are chosen for convenience only and without limitation to the scope of the invention. Many other embodiments may be devised by those skilled in the art without departing from the scope and spirit of the invention as defined by the appended claims.

The embodiments of the invention in which an exclusive property or privilege is claimed are defined as follows:

1. A controller for a stepper motor driven size control apparatus for a machine tool system comprising:
    a microprocessor including random access memory means;
    non-volatile read-only memory means coupled to the microprocessor, including at least one table of contiguous memory words individually addressable by the microprocessor;
    pulser means coupled to the microprocessor and to the stepper motor, operative on command by the microprocessor to generate a step command pulse of predetermined width for transmission to the stepper motor after a time duration determined by the contents of a table entry of the read-only memory means fetched by the microprocessor and transmitted to the pulser means;
    a plurality of input command channels coupled between the machine tool system and the microprocessor, a plurality of output command channels coupled between the microprocessor and the machine tool system, a display unit coupled to the microprocessor;
    the microprocessor further including means for successively addressing and fetching the contents of the read-only memory table words from one addressable table boundry to another and for successively transmitting each fetched word contents to the pulser means, means for interpreting input commands received over the input channels, means for generating output commands for transmission over the output channels, adjustable limit means for selecting and indicating a maximum allowable number of machine tool compensations initiated by the controller for the same cutting surface, and means for controlling and monitoring the display unit including means for scanning the adjustable limit means, means for incrementing a counter whenever a cutting surface compensation is initiated, and means for activating a predetermined one of the plurality of output command channels whenever the counter contents equal the maximum number indicated by the adjustable limit means; and
    means for furnishing electric power to the microprocessor, the read-only memory means, the pulser means, and the display unit.

2. The controller of claim 1 wherein the display unit further comprises:
    indicating means for visually displaying the current number of cutting surface compensations initiated by the controller;
    and wherein the means for controlling and monitoring the display unit further includes means for selectably initializing and subsequently altering the indicating means in accordance with the contents of the incremented counter.

* * * * *